United States Patent Office 3,551,493
Patented Dec. 29, 1970

3,551,493
ALKYL- AND CYCLOALKYL-AMINO-PROPANOL-CYCLOPENTYL- AND CYCLOPENTENYL-PHENOL ETHERS
Heinrich Ruschig, Bad Soden, Taunus, Karl Schmitt, Frankfurt am Main, Hans Lessenich, Kelkheim, Taunus, and Gunther Hartfelder, Frankfurt am Main, Germany, assignors to Farbwerke Hoechst Aktiengesellschaft vormals Meister Lucius & Bruning, Frankfurt am Main, Germany, a corporation of Germany
No Drawing. Filed Mar. 7, 1968, Ser. No. 711,182
Claims priority, application Germany, Mar. 10, 1967, F 51,784; Dec. 8, 1967, F 54,258
Int. Cl. C07c 93/06
U.S. Cl. 260—570.7     3 Claims

ABSTRACT OF THE DISCLOSURE

Basically substituted cyclopentyl- or cyclopentenyl-phenol ethers,

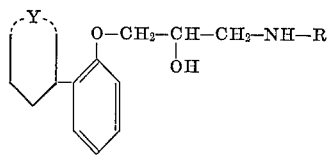

in which R represents a branched chain alkyl or cycloalkyl containing 3 to 6 carbon atoms and Y is —CH$_2$—CH$_2$— or —CH=CH— their optically active isomers and salts of the racemic or optically active bases, are disclosed to have a depressing activity on the stimulated heart metabolism.

---

The present invention relates to basically substituted cyclopentyl-phenol ethers and to a process for preparing them.

More particularly, the present invention provides basically substituted cyclopentyl- or cyclopentenyl-phenol ethers of the general Formula I

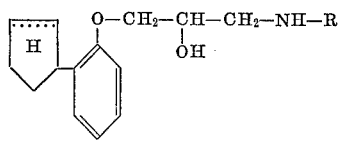

wherein the cyclopentyl ring may contain a double linkage in 2,3-position and R represents a branched chain alkyl or a cycloalkyl containing 3 to 6 carbon atoms, their optically active isomers and salts of the racemic or optically active bases.

The present invention also provides a process for preparing the above-identified compounds of the Formula I, which comprises (a) Reacting the epoxide of the Formula II

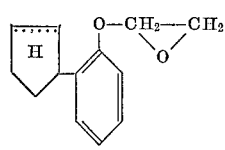

with an amine of the general Formula III

in which R has the meaning given above, or (b) Reacting a compund of the general Formula IV

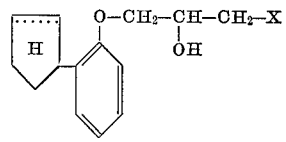

in which X represents a halogen atom, the sulfuric acid radical or a sulfonic acid radical, with an amine of the general Formula III, or (c) Reacting the amine of the Formula V

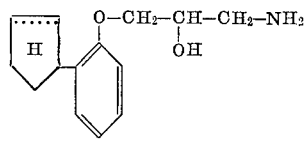

with a compound of the general Formula VI

X—R         (VI)

in which X and R have the meanings given above, or (d) Reacting the amine of the Formulae V or VII

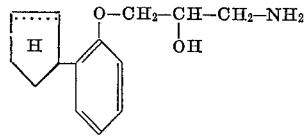

with aliphatic or cycloaliphatic ketones containing 3–6 carbon atoms, and reducing, simultaneously or subsequently, the condensation product, or (e) Reducing a ketone of the general Formula VIII

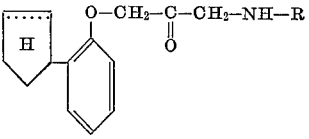

in which R has the meaning given above, or (f) Hydrolyzing a compound of the general Formula IX

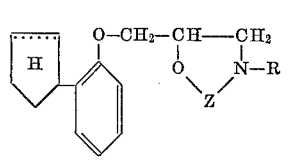

in which R has the meaning given above and Z represents a carbonyl group or a methylene group which may be substituted by a phenyl group, or one or two low molecular weight alkyl groups, or (g) Reacting, in the presence of an acid-binding agent, the cyclopentyl- or cyclopentenyl-phenol of the general Formula X

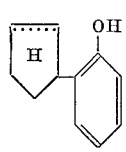

with a compound of the general Formula XI

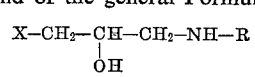

in which X and R have the meanings given above, or (h) Splitting off the benzyl groups and/or hydrolyzing the acyl group in a compound of the general Formula XII

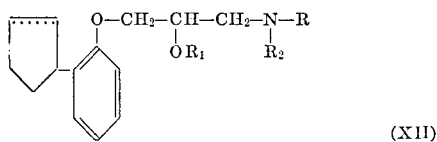

(XII)

in which R has the meaning given above, $R_1$ represents hydrogen, an acyl group or the benzyl group, and $R_2$ represents hydrogen or the benzyl group, but in which $R_1$ and $R_2$ cannot simultaneously represent hydrogen, or (i) Hydrogenating a racemic or optically active cyclopentenyl-phenol ether of the Formula XIII

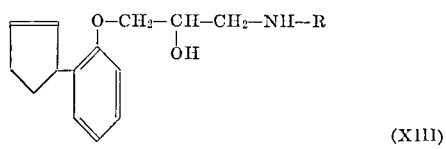

(XIII)

in which R has the meaning given above, and, if desired, reacting the basic compounds obtained with optically active acids, setting free therefrom the optically active bases and converting the racemic or optically active bases into salts of physiologically tolerated acids. In the Formulae II, IV, V, VII, VIII, IX, X and XII, the cyclopentyl ring may contain a double linkage in 2,3-position.

As amines of the general Formula III, there may be used for the reactions according to the methods (a) and (b) amines which contain a branched aliphatic hydrocarbon radical having 3 to 6 carbon atoms, for example isopropylamine, isobutylamine, sec. butylamine, tert. butylamine, and amines containing a cycloaliphatic hydrocarbon radical having 3 to 6 carbon atoms, for example cyclopropylamine and cyclohexylamine. The use of isopropylamine and tert. butylamine has proved especially advantageous.

The introduction of the amine group according to the method (a) is effected, for example, by reacting both components, preferably in the presence of organic solvents, for example alcohols such as methanol, ethanol, isopropanol, or aromatic solvents such as benzene or toluene, or ethers such as dioxane or tetrahydrofurane, or carboxylic acid amides, especially dimethylformamide. According to a preferred method of operation, the two components are dissolved in alcohol and allowed to react with one another at an elevated temperature. As reaction temperatures, temperatures in the range of from room temperature to the boiling point of the solvent may be used.

The glycide ether (II) used as the starting substance in the method of operation (a), can be prepared by known methods for example by the reaction of 2-cyclopentyl-phenol or 2-($\Delta^2$-cyclopentenyl)-phenol with epichlorhydrin in the presence of alkali, if desired in the presence of water or of a water-free or water-containing solvent.

In the method of operation (b), the $\gamma$-halogeno-$\beta$-hydroxypropyl ether of the 2-cyclopentyl- or cyclopentenyl-phenol (IV) is used as starting substance. Instead of the halogen atom, preferably a chlorine or bromine atom, in $\gamma$-position, there may also be used the corresponding esters of sulfuric acid or esters of sulfonic acids. These starting substances can be obtained, for example, by the reaction of 2-cyclopentyl- or cyclopentenyl-phenol with epichlorhydrin under acid reaction conditions or by cleavage of the epoxide (II) with a hydrohalic acid, sulfuric acid or a sulfonic acid. They may also be obtained by partial esterification of the glycerin ether of 2-cyclopentyl- or cyclopentenyl-phenol. For effecting the reaction with an amine of the general Formula III, the operation is carried out in the presence or in the absence of suitable organic solvents, for example alcohols such as methanol, ethanol or isopropanol, or aromatic solvents such as benzene, toluene, or ethers such as dioxane, tetrahydrofurane, or carboxylic acid amides, especially dimethylformamide. The reaction may be effected at temperatures in the range of from room temperature to the boiling point of the solvent; preferably, an elevated temperature is used. In order to bind the acid set free, for example a hydrohalic acid, the operation may be carried out in the presence of acid-binding agents, for example tert. amines such as triethylamine, pyridine, or alkali metal or alkaline earth metal hydroxides, carbonates or bicarbonates. It is also possible to use double the molar quantity of the amine used.

For the method of operation desrcibed under (c), 3-(2'-cyclopentyl- or cyclopentenyl-phenoxy)-2-hydroxy-1-aminopropane (V) is used. This compound may also be used in the form of its salt. The reaction with a reactive ester of the general Formula VI is carried out under the reaction conditions mentioned under (b). The amine (V) used as starting substance may be obtained, for example, by reacting the epoxide of the Formula II with ammonia. It may also be obtained from the halogeno-compound (III) and ammonia.

According to the method of operation (d), the same amine (V) is hydrogenated with a ketone corresponding to the meaning of R in the presence of catalytically activated hydrogen. During this operation, the double linkage in the cyclopentenyl ring can be hydrogenated simultaneously. If cyclopentenyl compounds are to be prepared, mild hydrogenation conditions must be applied in order to preserve the double linkage, for example by using metal catalysts that have attenuated activity or complex metal hydrides.

As ketones, there may be mentioned, for example, acetone, methylethyl-ketone, cyclopropanone and cyclohexanone. As catalysts, there may be used, for example Raney nickel, platinum or palladium. In general, the operation is carried out in the presence of an inert solvent such as methanol, ethanol or isopropanol. It is also possible first to condense the amine (V) with the above-mentioned ketone and then to reduce, as described above, the Schiff base obtained, if desired without isolating it. The reduction of the azomethine may also be effected in the usual manner by means of sodium boranate, lithium alanate or other complex metal hydrides, as well as with aluminum amalgame.

The process (d) yields only such compounds of the Formula I in which the group R is bound to the nitrogen atom by a secondary carbon atom.

The process may also be carried out as described under (d), by using the amino-ketone (VII). The reaction is effected in the same manner as with aminopropanol (V), because by this reduction, either in one reaction step or after preparation and, if desired, after isolation of the azomethine, the keto group is reduced simultaneously with the azomethine double linkage. The amino-ketone used as starting substance may be prepared, for example, by mild oxidation of the aminopropanol (V).

The method of operation described under (e), i.e. the reduction of amino-ketones of the general Formula VIII, may likewise be effected in the manner described for process (d), i.e. by catalytic hydrogenation. The reduction of the keto group may also be effected with lithium alanate or with other complex metal hydrides or according to Meerwein-Ponndorf with aluminum isopropylate. The ketones of the general Formula VIII may be prepared, for example, by the reatcion of 1-halogeno-2-oxo-3 - (2'-cyclopentyl- or cyclopentenyl-phenoxy) - propane with an amine of the general Formula III.

Another method for carrying out the process of the present invention comprises the hydrolysis of an oxazolidone or oxazolidine of the general Formula IX according to the method of operation (f). Such oxazolidones may be obtained, for example, by reacting 1-amino-2-hydroxy-3-(2'-cyclopentyl- or cyclopentenyl-phenoxy)-propane with a reactive derivative of carbonic acid such as diethyl carbonate, chlorocarbonic acid methyl ester or phosgene, or by reacting a 5-hydroxymethyl-oxazolidone-(2), which may be correspondingly substituted in 3-position, in form of a hydrohalic acid ester, sulfuric acid ester or sulfonic acid ester, with an alkali-2-cyclopentyl- or cyclopentenyl-phenolate. Suitable oxazolidines may be prepared, for example, by reacting 1-amino-2-hydroxy-3-(2'-cyclopentyl- or cyclopentenyl-phenoxy)-propane (V) with aldehydes or ketones. Oxazolidones or oxazolidines which do not carry substituents at the nitrogen atom can be alkylated with compounds of the general Formula VI as described under method of operation (c). The hydrolysis of these oxazolidone or oxazolidine derivatives can be effected in an acid or alkaline medium, for example by means of dilute hydrochloric acid, dilute sulfuric acid, dilute sodium hydroxide solution or dilute potassium hydroxide solution. For accelerating the hydrolysis, it is advantageous to heat the reaction solution. The hydrolysis may also be effected in the presence of water-soluble solvents, for example low molecular weight alcohols.

The products of the present invention may also be prepared according to the method of operation described under (g) using the above-mentioned phenol (X). The phenol may also be used in the form of its alkali metal salt such as the sodium or potassium salt. As reaction components of the general Formula XI, 1-halogeno-2-hydroxy-3-alkyl-amino-propanes are used. It is also possible to start from sulfuric acid esters or sulfonic acid esters of 1,2-dihydroxy-3-alkylamino-propanes. The reaction is advantageously effected in the presence of an acid-binding agent, for example alkali metal hydroxide. In an alkaline medium the 1-halogeno-2-hydroxy-3-alkylamino-propane used may pass intermediarily into the corresponding 1,2-epoxy-propane which reacts with the phenol. The reaction may be effected in the presence or in the absence of solvents, for example alcohols such as methanol, ethanol or isopropanol, or aromatic solvents such as benzene or toluene, or ethers such as dioxane or tetrahydrofurane, or carboxylic acid, amides, especially dimethylformamide, at room temperature or at an elevated temperature, up to the boiling point temperature of the solvent used. The compounds of the general Formula XI used as starting substances may be obtained, for example, by reacting an amine of the general Formula III with epichlorhydrin at lower temperatures.

The products of the invention may also be obtained by separating from compounds of the general Formula XII the protecting groups $R_1$ or $R_2$ which protect the hydroxy and/or the secondary amino group. As protective groups, especially acyl groups and/or the benzyl group may be used. The separation of the benzyl group is advantageously effected by catalytic hydrogenation in the presence of noble metals such as palladium or platinum. In the case of cyclopentenyl compounds of the general Formula XII, the double linkage of the cyclopentenyl ring is in general hydrogenated simultaneously.

If acyl compounds are used, the acyl group preferably being a low molecular weight aliphatic acyl radical such as the acetyl or propionyl radical, the separation is effected hydrolytically either in an acid or in an alkaline aqueous medium. The corresponding benzyl and/or acyl compounds may be prepared according to one of the above-described methods, using the correspondingly acylated and/or benzylated starting substances. If starting substances of the Formula XII are to be prepared in which $R_1$ represents an acyl group, it is possible, for example, to acylate the compound of the general Formula III and to convert the corresponding acyl compounds according to the method (b) to compounds of the Formula XII. The same applies to compounds in which $R_1$ represents the benzyl radical, in which case the corresponding hydroxy compounds are benzylated instead of acylated. If compounds of the Formula XII in which $R_2$ represents the benzyl group are to be used as the starting substances, it is possible, when proceeding according to the methods (a), (b), (c), (e) or (g), to use the corresponding N-benzyl compounds instead of the primary amines. If acyl and benzyl groups are standing side by side for $R_1$ and $R_2$, these groups may be split off successively in the described manner.

Finally, the cyclopentyl-phenol ethers of the Formula I may also be obtained by hydrogenating the basically substituted cyclopentenyl-phenol ethers of the general Formula XIII prepared according to any one of the above-described methods. As catalysts for this hydrogenation, which is preferably carried out in the presence of an inert solvent such as methanol, ethanol or isopropanol, at room temperature or at elevated temperature, at ordinary or elevated pressure, there may be used, for example, Raney nickel, platinum or palladium.

In the methods of operation (a), (b), (g) or (h), it may sometimes be of advantage to combine the preparation of the starting substances directly with the further reaction, i.e. not to isolate the starting subsances separately.

The products of the present invention may be obtained as free bases or in the form of their salts and, if necessary they may be purified according to the usual working up methods, for example by recrystallization or, if desired, conversion into the free base and subsequent treatment with a suitable acid. If desired, the products may be converted into salts of physiologically tolerated organic or inorganic acids.

As organic acids, there may be mentioned, for example, acetic acid, malonic acid, propionic acid, lactic acid, succinic acid, tartaric acid, maleic acid, fumaric acid, citric acid, malic acid, benzoic acid, salicylic acid, hydroxy-ethane-sulfonic acid, aceturic acid, ethylene-diamino-tetracetic acid, embonic acid and synthetic resins which contain acid groups.

As inorganic acids, there may be mentioned, for example hydrohalic acids such as hydrochloric or hydrobromic acid, sulfuric acid, phosphoric acid and amidosulfonic acid.

The optically active isomers of the cyclopentyl-phenol ethers may be obtained by cleaving the racemic compounds of the general Formula I with optically active acids into their components.

An acids which may be used for the preparation of optically active salts according to the present invention, there may be mentioned, for example (+)- and (−)-tartaric acid, (+)- and (−)-dibenzoyl-tartaric acid, (+)- and (−)-ditoluyl-tartaric acid, (+)- and (−)-mandelic acid, (+)- and (−)-camphoric acid, (+)-camphor-$\beta$-sulfonic acid, (+)-$\alpha$-bromocamphor-$\beta$-sulfonic acid, and N-(p-nitrobenzoyl)-(+)-glutamic acid.

The preparation of the optically active salts may be effected in water, water-containing or water-free organic solvents. The use of alcohols or of esters of organic carboxylic acids is advantageous.

For preparing optically active compounds, the racemate of the base is reacted in a solvent, preferably in molar weight proportions, with an optically active acid and the optically active salt of the compounds of the general Formula I is then isolated. In certain cases, it is possible to use only half an equivalent of the optically active acid in order to remove one optical antipode from the racemate, but it is also possible to use excess quantities of optically active acid. Depending on the nature of the optically active acid, the desired antipode may be obtained either directly or from the mother liquor of the first crystallization product. The optically active base may then be isolated from the salt in the usual manner and this optically active base may then be converted into a salt of one of the above-mentioned physiologically tolerated organic or inorganic acids.

The optically active antipodes of the cyclopentyl-phenol ethers may also be obtained by catalytical hydrogenation of the corresponding optically active cyclopentenyl-phenol ether.

The compounds of the present invention are valuable medicaments which possess advantageous pharmacological properties and which have, specifically, a strong action as antagonists of the β-receptors of the adrenergic nervous system. For example, 1-tert.butylamino-2-hydroxy-3-(2'-cyclopentyl-phenoxy)-propane has proved to be a strongly active antagonist of the β-receptors of the adrenergic nervous system.

The antagonistic action of the compounds of the present invention to aludrine, which was tested on the isolated trachea of a Guinea pig and on the isolated vestibule of a Guinea pig, is in the same order of strength as that of the known 1-isopropylamino-2-hydroxy-3-(α-naphthoxy)-propane. With regard to acute toxicity, too, the products of the present invention correspond to the known compound.

In addition thereto, the new compounds are distinguished over the known compounds by an essentially longer period of action, an advantage which can be proved in vitro as well as in vivo. Thus, for example, a comparative test carried out with 1-tert.butylamino-2-hydroxy-3-(2'-cyclopentyl-phenoxy)-propane (substance A) and with 1-isopropylamino-2-hydroxy-3-(α-naphthoxy)-propane (substance B), in an anesthetized dog in vivo, gave the following results:

(a) As $AD_{50}$ for the antagonistic action on the diastolic blood pressure reduction under aludrine:

| After | Minutes | | | | |
|---|---|---|---|---|---|
| | 6 | 11 | 16 | 26 | |
| Substance A | 12 | 14 | 12 | 10 | µg./k.g. I.V. |
| Substance B | 16 | 22 | 25 | 28 | µg./k.g. I.V. |

(b) For the antagonistic action against the frequency increase under aludrine:

| After | Minutes | | | | |
|---|---|---|---|---|---|
| | 6 | 11 | 16 | 26 | |
| Substance A | 40 | 28 | 18 | 20 | µg./k.g. I.V. |
| Substance B | 16 | 40 | >40 | >40 | µg./k.g. I.V. |

The levo-rotatory optically active isomers of the products of the invention are distinctly superior to the corresponding racemic compounds.

The corresponding cyclopentenyl compounds, too, are strongly antagonistic to the β-receptors of the adrenergic nervous system and do not distinguish from the corresponding cyclopentyl compounds with regard to strength of action and duration of action.

The products of the present invention may be used as medicaments in human therapy for the treatment of cardiac and blood circulation diseases, for example for the treatment of Angina pectoris and cardiac arrhythmia. They are also suitable for the prevention of excessive cardiac activity.

The products of the present invention, in form of the free bases or of their salts, may be administered perorally or parenterally. For peroral administration, they are brought into the form of tablets or dragées, if desired in admixture with the pharmaceutically usual carriers and/or stabilizers; for parenteral administration, they are brought into the form of solutions. As carriers for tablets, there may be used, for example lactose, starch, tragacanth and/or magnesium stearate.

For injection purposes, a dose in the range of from 2–20 mg. will be used, whereas the dose for peroral administration will be in the range of from 5 and 150 mg.; a single tablet or a dragée may contain about 2 to 50 mg. of active substance.

The following examples illustrate the invention but they are not intended to limit it thereto:

EXAMPLE 1

21.8 g. (0.1 mol) of 1,2 - epoxy - 3 - (2' - cyclopentylphenoxy)propane, boiling at 113–115° C./0.2 mm. Hg, (prepared from 2-cyclopentyl-phenol and epichlorhydrin in the presence of alkali) were dissolved in 250 ml. of ethanol; to this solution, there were added dropwise, while stirring, 8.9 g. (0.15 mol) of isopropylamine. The reaction mixture was stirred for 2 hours at 60° C. and then the solvent and the excess isopropylamine were removed by distillation. The residue which had been purified via the aqueous hydrochloride, crystallized, after removal of the ether by evaporation, upon rubbing or inoculation and yielded, after recrystallization from n-heptane, the 1-isoproplamino-2-hydroxy-3-(2'-cyclopentyl - phenoxy)-propane which was found to melt at 69–70° C.

The hydrochloride was obtained with ethereal hydrochloric acid from the free base. It was found to melt, after recrystallization from a mixture of methanol and ether, at 139–140° C.

In analogous reaction, there was obtained with sec. butylamine, the 1-sec. butylamino-2-hydroxy - 3 - (2'-cyclopentyl-phenoxy) - propane hydrochloride, melting at 115–116° C.; with tert. butylamine, the 1-tert. butylamino-2-hydroxy - 3 - (2'-cyclopentyl-phenoxy)-propane hydrochloride, melting point 123–124° C.; with cyclopropylamine, the 1-cyclopropylamino-2-hydroxy - 3-(2'-cyclopentyl-phenoxy)-propane-hydrochloride, melting at 131–132° C.; with cyclopentylamine, the 1-cyclopentylamino - 2 - hydroxy-3-(2'-cyclopentyl-phenoxy)-propane hydrochloride, melting point 140–141° C.; and with cyclohexylamine, the 1-cyclohexylamino-2-hydroxy-3-(2'-cyclopentyl-phenoxy) - propane hydrochloride, melting point 138–139° C.

EXAMPLE 2

25.5 g. (0.1 mol) of 1-chloro-2-hydroxy-3-(2'-cyclopentyl-phenoxy)-propane, boiling point 135° C./0.1 mm. Hg (prepared by the reaction of 1,2-epoxy-3-(2'-cyclopentyl-phenoxy)-propane with hydrogen chloride), dissolved in 250 ml. of ethanol, were combined with 17.7 g. (0.3 mol) of isopropylamine and stirred for 5 hours at 60° C. After evaporation of the solvent and of the excess of isopropylamine, the residue was taken up in dilute hydrochloric acid, shaken with ether and the base was extracted with ether from the aqueous solution which had been rendered alkaline. The chlorhydrate thereof, i.e. the 1-isopropylamino-2 - hydroxy - 3-(2' - cyclopentylphenoxy)-propane hydrochloride, was found to melt at 139–140° C.

EXAMPLE 3

4.8 g. of 1-sec. butylamino-2-hydroxy-3-[2'-(Δ²-cyclopentenyl)-phenoxy] - propane hydrochloride were dissolved in methanol and hydrogenated in the presence of palladium black at room temperature until the calculated amount of hydrogen was taken up. After separation of the catalyst and removal of the solvent by evaporation, 1-sec. butylamino-2-hydroxy - 3 - (2'-cyclopentyl-phenoxy)-propane hydrochloride remained behind which, after recrystallization from a mixture of methanol and ether, was found to melt at 115–116° C.

In analogous reaction, there was obtained from 1-tert. butylamino-2-hydroxy-3[2'-(Δ² - cyclopentenyl) - phenoxy]-propane hydrochloride, the 1-tert. butylamino-2-hydroxy-3-(2'-cyclopentyl-phenoxy)-propane hydrochloride melting at 123–125° C.

EXAMPLE 4

4 g. of (−)-1-isopropylamino-2-hydroxy - 3 - [2'-(Δ²-cyclopentenyl)-phenoxy]-propane hydrochloride, having a melting point of 104–105° C. and an angle of rotation $[\alpha]_D^{20} = -44.4°$ (c=1.0, in methanol) were hydrogenated in methanol with palladium black until the theoretically calculated amount of hydrogen was taken up. After removal of the solvent by evaporation, there remained behind as residue the (—)-1-isopropylamino-2-hydroxy-3-(2'-cyclopentylphenoxy)-propane hydrochloride which, after recrystallization from a mixture of methanol and ether, was found to have a melting point of 116–117° C. and an angle of rotation $[\alpha]_D^{20} = -27.6°$ (c.=1.0, in methanol).

EXAMPLE 5

A solution of 15.2 g. of 1-isopropylamino-2-hydroxy-3-(2'-cyclopentyl-phenoxy)-propane in 75 ml. of ethyl acetate was combined with a solution of 8.25 g. of D-(—)-mandelic acid in 75 ml. of ethyl acetate and, after having allowed the whole to stand for one day, the crystals that had separated were filtered off with suction. 10.9 g. of (—)-1-isopropylamino-2-hydroxy - 3 - (2'-cyclopentyl-phenoxy)-propane-D-(—) - mandelate were obtained; after recrystallization, the substance was found to have a melting point of 133–134° C. and an angle of rotation $[\alpha]_D^{20} = -53.2°$ (c.=1; in methanol).

By treatment with dilue sodium hydroxide solution, there was obtained from this salt the (—)-1-isopropylamino-2-hydroxy - 3 - (2'-cyclopentyl-phenoxy)-propane, the hydrochloride of which was found to have, after recrystallization from a mixture of ethanol and ether, a melting point of 116–117° C. and an angle of rotation $[\alpha]_D^{20} = -27.4°$ (c.=1, in methanol).

EXAMPLE 6

7.34 g. (0.02 mol) of 1-(N-isopropyl-N-benzyl-amino)-2-hydroxy-3-(2'-cyclopentyl-phenoxy) - propane, melting point 69–70° C. [prepared from 1,2-epoxy-3-(2'-cyclopentyl-phenoxy)-propane and N - isopropyl - N-benzyl-amine] were dissolved in methanol, acidified with hydrogen chloride and hydrogenated under atmospheric pressure at 65° C. in the presence of palladium until the calculated amount of hydrogen was taken up. After removal of the solvent by evaporation from the filtered solution, the residue solidified in crystalline form. The 1-isopropylamino-2-hydroxy-3-(2' - cyclopentyl - phenoxy)-propane-hydrochloride thus obtained was found to melt at 139–140° C. (after recrystallization from a mixture of methanol and ether).

EXAMPLE 7

6.06 g. (0.02 mol) of 3-isopropyl-5-(2'-cyclopentyl-phenoxy-methyl)-oxazolidone-(2), melting point 106–107° C. [prepared by cyclization of 1-(N-carbomethoxy-N-isopropylamino) - 2 - hydroxy-3-(2'-cyclopentyl-phenoxy)-propane] were mixed with 5 g. of finely pulverized NaOH and heated for 10 minutes to 150° C. The cooled reaction mixture was taken up in water, acidified with dilute hydrochloric acid and extracted with ether. The aqueous layer was rendered alkaline with dilute sodium hydroxide solution and shaken with ether. After addition of methanolic hydrochloric acid to the dried ether extract, the 1-isopropylamino-2-hydroxy-3-(2' - cyclopentyl-phenoxy)-propane hydrochloride precipitated in crystalline form. The mixed melting point test confirmed the identity of this substance with a substance prepared by another method.

EXAMPLE 8

23.5 g. (0.1 mol) of 1-amino-2-hydroxy-3-(2'-cyclopentyl-phenoxy)-propane, melting point 74–75° C. [prepared from 1,2-epoxy-3-(2'-cyclopentyl-phenoxy)-propane and ammonia] were dissolved in 100 ml. of acetone and hydrogenated in the presence of platinum dioxide at room temperature and atmospheric pressure until the calculated amount of hydrogen was taken up. The filtered reaction solution was then concentrated. With ethereal hydrochloric acid, there was obtained from the residue the 1-isopropylamino-2-hydroxy-3-(2'-cyclopentyl - phenoxy)-propane hydrochloride which was found to melt at 139–140° C.

EXAMPLE 9

A solution of 47.4 g. of 1-tert. butylamino-2-hydroxy-3-(2'-cyclopentyl-phenoxy)-propane in 90 ml. of isopropanol was combined with a solution of 24.5 g. of D-(—)-mandelic acid in 90 ml. of isopropanol; after having allowed the whole to stand for several days, the crystals that had precipitated were filtered off with suction. 27.9 g. of (—)-1-tert. butylamino-2-hydroxy-3-(2'-cyclopentyl-phenoxy)-propane-D-(—)-mandelate were obtained; after recrystallization from isopropanol, the substance was found to melt at 133–134° C. and to have an angle of rotation $[\alpha]_D^{20} = -50.7°$ (c.=1, in methanol).

From this salt, there was obtained by treatment with dilute sodium hydroxide solution the (—)-1-tert. butylamino-2-hydroxy-3-(2'-cyclopentyl-phenoxy)-propane, the hydrochloride of which was found to have, after recrystallization from a mixture of methanol and ether, a melting point of 92–93° C. and an angle of rotation $[\alpha]_D^{20} = -24.6°$ (c.=1, in methanol).

EXAMPLE 10

21.6 g. (0.1 mol) of 1,2-epoxy-3-[2'-($\Delta^2$-cyclopentenyl)-phenoxy]-propane, boiling point 106° C./0.05 mm. Hg [prepared from 2-($\Delta^2$-cyclopentenyl)-phenol and epichlorohydrin in the presence of alkali] were dissolved in 250 ml. of ethanol and to this solution, there were added dropwise, while stirring, 8.9 g. (0.15 mol) of isopropylamine. The reaction mixture was stirred for 2 hours at 60° C. and the solvent and the excess isopropylamine were distilled off. The residue was dissolved in dilute hydrochloric acid and shaken with ether. The base was set free from the aqueous solution which had been rendered alkaline and was taken up in ether. After evaporation of the ether, it crystallized upon rubbing or inoculation and yielded, after recrystallization from n-heptane, the 1-isopropylamino-2-hydroxy-3-[2'-($\Delta^2$-cyclopentenyl)-phenoxy]-propane melting at 62° C.

From the free base dissolved in ether, there was obtained upon addition of ethanolic hydrochloric acid the hydrochloride in an almost quantitative yield. After recrystallization from a mixture of ethanol and ether, it was found to melt at 119–120° C.

In analogous reaction, there was obtained with isobutylamine, the 1 - isobutylamino-2-hydroxy-3-[2' - ($\Delta^2$-cyclopentenyl)-phenoxy]-propane hydrochloride, melting at 146–148° C.; with sec. butylamine, the 1-sec. butylamino-2-hydroxy-3-[2'-($\Delta^2$-cyclopentenyl) - phenoxy] - propane hydrochloride, melting at 128–129° C.; with tert. butylamine, the 1-tert. butylamino-2-hydroxy-3-[2'-($\Delta^2$-cyclopentenyl)-phenoxy]-propane hydrochloride, melting at 114–115° C.; and with cyclohexylamine, the 1-cyclohexylamino-2-hydroxy-3-[2'-($\Delta^2$-cyclopentenyl) - phenoxy]-propane hydrochloride, melting at 135–136° C.

EXAMPLE 11

25.3 g. (0.1 mol) of 1-chloro-2-hydroxy-3-[2'-($\Delta^2$-cyclopentenyl)-phenoxy]-propane [prepared from 1,2-epoxy-3-[2'-($\Delta^2$-cyclopentenyl)-phenoxy]-propane and hydrogen chloride], dissolved in 250 ml. of ethanol, were combined with 17.7 g. (0.3 mol) of isopropylamine and stirred for 5 hours at 60° C. After evaporation of the solvent and of the excess of isopropylamine, the residue was taken up in dilute hydrochloric acid and shaken with ether. From the aqueous solution which had been rendered alkaline, the free base was extracted with ether. The hydrochloride thereof, i.e. the 1-isopropylamino-2-hydroxy-3-[2'-($\Delta^2$-cyclopentenyl)-phenoxy] - propane hydrochloride was found to melt at 119–120° C.

EXAMPLE 12

A solution of 24 g. of 1-isopropylamino-2-hydroxy-3-[2'-($\Delta^2$-cyclopentenyl)-phenoxy]-propane in 100 ml. of isopropanol was combined with a solution of 9.6 g. of D-(—)-mandelic acid in 100 ml. of isopropanol and the crystals that had precipitated after standing for one day were filtered off. 16.2 g. of (—)-1-isopropylamino-2-hydroxy-3-[2'-(Δ²-cyclopentenyl)-phenoxy]-propane-D-(—)-mandelate were obtained; after recrystallization from isopropanol, the substance was found to melt at 135–136° C. and to have an angle of rotation $[\alpha]_D^{20} = -62.5$ (c.=1, in methanol).

From this salt, there was obtained upon treatment with dilute sodium hydroxide solution and ether, the (—)-1-isopropylamino - 2 - hydroxy-3-[2' - (Δ²-cyclopentenyl)-phenoxy]-propane, which was found to have a melting point of 40–42° C. (after recrystallization from n-heptane) and an angle of rotation $[\alpha]_D^{20} = -23.1°$ (c.=1, in methanol). The base yielded a hydrochloride melting at 104–105° C. (recrystallized from a mixture of ethanol and ether) and having an angle of rotation $[\alpha]_D^{20} = 43.7°$ C. (c.=1, in methanol).

EXAMPLE 13

25.3 g. (0.1 mol) of 1-isopropylamino-2-oxo-3-(2'-cyclopentyl-phenoxy)-propane [prepared from 1-chloro-2-hydroxy - 3-(2'-cyclopentyl-phenoxy)-propane (preparation cf. Example 2) by oxidation with chromic acid and subsequent reaction with isopropylamine] were dissolved in 250 ml. of methanol, acidified with hydrogen chloride and hydrogenated in the presence of palladium black at ordinary pressure until completion of the uptake of hydrogen. After separation of the catalyst by filtration, the methanolic solution was evaporated to dryness and the residue was recrystallized from a mixture of ethanol and ether. The 1-isopropylamino-2-hydroxy-3-(2'-cyclopentyl-phenoxy)-propane hydrochloride thus obtained was found to have a melting point of 139–140° C. and to be identical with the corresponding compound from Example 1.

EXAMPLE 14

23.5 g. (0.1 mol) of 1-amino-2-hydroxy-3-(2'-cyclopentyl-phenoxy)-propane (preparation cf. Example 8) were dissolved in 250 ml. of tetrahydrofurane and combined with 8.4 g. (0.1 mol) of finely pulverized sodium bicarbonate and 12.3 g. (0.1 mol) of isopropyl bromide. After having boiled the mixture for 2 days under reflux, it was allowed to cool, inorganic matter was filtered off and the solvent was removed by distillation. The residue was taken up in ether, undissolved matter was filtered off and the filtrate was combined with ethanolic HCl. The 1-isopropylamino-2-hydroxy-3-(2'-cyclopentyl-phenoxy)-propane hydrochloride thus obtained was found, after recrystallization from a mixture of ethanol and ether, to have a melting point of 139–140° C.

We claim:

1. Basically substituted cyclopentyl- or cyclopentenyl-phenol ethers of the general formula

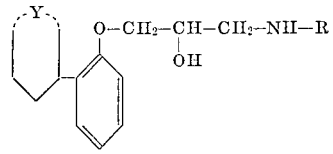

in which Y is —CH₂—CH₂— or —CH=CH— and R represents a branched chain alkyl or cycloalkyl containing 3 to 6 carbon atoms, their optically active isomers and salts of racemic or optically active bases.

2. 1-tert.butylamino-2-hydroxy-3-(2'-cyclopentyl-phenoxy)-propane.

3. 1 - isopropylamino-2-hydroxy-3-3[2'-(Δ²-cyclopentyl)-phenoxy]-propane.

References Cited

UNITED STATES PATENTS 3,459,782   8/1969   Koppe et al. _____ 260—570.7X

FOREIGN PATENTS 39-5133   7/1965   Japan _____ 260—570.7

OTHER REFERENCES

Fujimura et al., "Chemical Abstracts," vol. 61, p. 16051 (1964).

ROBERT V. HINES, Primary Examiner

U.S. Cl. X.R.

260—307, 345, 456, 458, 490, 501.11, 501.17, 501.19, 566, 612, 621; 424—330